(12) United States Patent
Deng

(10) Patent No.: US 11,984,997 B2
(45) Date of Patent: May 14, 2024

(54) SYSTEM AND METHOD FOR ADAPTING A POLARITY OF A DATA SIGNAL

(71) Applicant: ZHEJIANG DAHUA TECHNOLOGY CO., LTD., Zhejiang (CN)

(72) Inventor: Zhiji Deng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 373 days.

(21) Appl. No.: 17/353,707

(22) Filed: Jun. 21, 2021

(65) Prior Publication Data

US 2021/0314181 A1 Oct. 7, 2021

Related U.S. Application Data

(63) Continuation of application No. PCT/CN2018/123038, filed on Dec. 24, 2018.

(51) Int. Cl.
*H04L 12/10* (2006.01)
*H02H 11/00* (2006.01)
*H05B 45/37* (2020.01)

(52) U.S. Cl.
CPC ........... *H04L 12/10* (2013.01); *H02H 11/002* (2013.01); *H02H 11/006* (2013.01); *H05B 45/37* (2020.01)

(58) Field of Classification Search
CPC .............................. H02H 11/002; H04L 12/10
See application file for complete search history.

(56) References Cited

U.S. PATENT DOCUMENTS

| 5,331,323 | A | 7/1994 | Yamamoto |
| 5,617,473 | A | 4/1997 | Wietecha et al. |
| 2001/0045853 | A1 | 11/2001 | Saeki |
| 2006/0217847 | A1 | 9/2006 | Anderson |
| 2010/0156185 | A1 | 6/2010 | Kim et al. |
| 2013/0200874 | A1 | 8/2013 | Jin et al. |
| 2013/0207621 | A1 | 8/2013 | Nishibori et al. |

(Continued)

FOREIGN PATENT DOCUMENTS

JP H0818605 A 1/1996

OTHER PUBLICATIONS

International Search Report in PCT/CN2018/123038 dated Sep. 30, 2019, 5 pages.

(Continued)

*Primary Examiner* — Jared Fureman
*Assistant Examiner* — Christopher J Clark
(74) *Attorney, Agent, or Firm* — METIS IP LLC

(57) ABSTRACT

The present disclosure relates to a polarity correction circuit. The polarity correction circuit may include a detection module and a switching module. The detection module may be configured to detect a polarity of a DC voltage transmitted to a powered device and generate one or more control signals based on the polarity of the DC voltage. The switching module may be configured to receive the one or more control signals and a data signal transmitted from the powered device. The switching module may be further configured to adapt a polarity of the data signal based on the one or more control signals such that the polarity of the data signal is accordant with the polarity of the DC voltage.

19 Claims, 12 Drawing Sheets

(56) References Cited

U.S. PATENT DOCUMENTS

2014/0129850 A1     5/2014   Paul
2014/0331066 A1*   11/2014   Chiu ...................... H04L 12/10
                                                                      713/300

OTHER PUBLICATIONS

Written Opinion in PCT/CN2018/123038 dated Sep. 30, 2019, 4 pages.
The Extended European Search Report in European Application No. 18945199.0 dated Dec. 10, 2021, 11 pages.

* cited by examiner

SYSTEM AND METHOD FOR ADAPTING A POLARITY OF A DATA SIGNAL

CROSS-REFERENCE TO RELATED APPLICATIONS

This application is a Continuation of International Application No. PCT/CN2018/123038, filed on Dec. 24, 2018, the entire contents of which are hereby incorporated by reference.

TECHNICAL FIELD

The present invention generally relates to communication technology, and more specifically to apparatus, systems and methods for adapting a polarity of a data signal of single-pair Ethernet in communication technology.

BACKGROUND

A Power over Ethernet (PoE) technology can be used to transmit data and electric power on a twisted pair cable. The PoE system allows a single cable to provide both data connection and electric power to one or more powered devices such as wireless access points, IP cameras, and VoIP phones. There are several techniques for transmitting power over an Ethernet cable. An Ethernet cable generally includes four pairs. For 100BASE-T and 100BASE-TX, only two of the four pairs in the cable are used. FIG. 7 shows a traditional PoE system. The PoE system 700 may include a power sourcing equipment (PSE) 710 and a powered device (PD) 720. The PSE 710 includes a PSE module 712 that controls one or more operations of the PSE 710 (e.g., the detection and classification during power up of a PoE link, voltage turn on, current control, etc.). In some cases, two pairs of the twisted pair cable (e.g., the pair of lines 1 and 2, and the pair of lines 3 and 6) are used, and power can be supplied (from the PSE 710 to the PD 720) in common mode over the two pairs. As illustrated in FIG. 7, the network connector 711 of the PSE 710 and the network connector 721 of the PD 720 are generally registered jack 45 (also referred to herein as RJ45) connectors. In some cases, during power supply, a voltage +53 V and a voltage 0 V are applied to the pair of lines 3 and 6 and the pair of lines 1 and 2, respectively. For example, the voltage +53 V is applied to the pair of lines 3 and 6, and the voltage 0 V is applied to the pair of lines 1 and 2. As another example, the voltage +53 V is applied to the pair of lines 1 and 2, and the voltage 0 V is applied to the pair of lines 3 and 6. Each pair of the two pairs operates in common mode as one side of a direct current (DC) power supply fed to the PD 720.

With the development of communication technology (e.g., signal modulation technology), one or more new forms of network transmission, such as 100BASE-T1 and 1000BASE-T1, are developed. For the new form(s) of network transmission, the power can be supplied by a power sourcing equipment (PSE) over a single pair to a powered device (PD). Besides, Ethernet data (also referred to herein data signal(s)) can be transmitted over the single pair. The technology of transmitting the power and Ethernet data via a single pair can also be referred to as Enhanced PoE (EPoE). FIG. 8 shows an EPoE system 800. The EPoE system 800 includes a PSE 810 and a PD 820. The PSE 810 and the PD 820 are connected via a cable 830. The cable 830 can be connected to the connector 811 of the PSE 810 and the connector 821 of the PD 820. As illustrated in FIG. 8, the connectors 811 and 821 are generally RJ45 connectors. During power supply, the power is applied over a single pair (e.g., the pair of lines 1 and 2) of the four pairs of the cable 830. A voltage +53 V and a voltage 0 V can be applied over the lines 1 and 2, respectively. In the EPoE system 800, the power can be supplied in a differential mode and the data signals can also be transmitted in differential mode. The frequency of the power supply is relatively low, while the frequency of the Ethernet data is relatively high. Therefore, a high pass filter and/or a low pass filter can be used to separate the power supply and the Ethernet data.

However, because of a relatively long transmission distance between the PSE and the PD in practical use, the pair of lines may be cross connected when connecting the PSE and the PD (that is, the PSE and the PD are connected via a crossover cable), which may reverse the polarity of the data signals, and influence the transmission and analysis of the Ethernet data. It may be difficult for an operator to detect whether the pair of lines are cross connected or not. Therefore, it is desirable to design systems and methods for adapting the polarity of the data signals, so that the Ethernet data can be analyzed correctly.

SUMMARY

According to an aspect of the present disclosure, a polarity correction circuit is provided. The polarity correction circuit may include a detection module and a switching module. The detection module may be configured to detect a polarity of a DC voltage transmitted to a powered device and generate one or more control signals based on the polarity of the DC voltage. The switching module may be configured to receive the one or more control signals and a data signal transmitted from the powered device and adapt a polarity of the data signal based on the one or more control signals such that the polarity of the data signal is accordant with the polarity of the DC voltage.

In some embodiments, the detection module may be further configured to: in response to the polarity of the DC voltage being accordant with a predetermined polarity, generate a first control signal, the first control signal being configured to control the switching module to maintain the polarity of the data signal as received.

In some embodiments, the detection module may be further configured to: in response to the polarity of the DC voltage being inverted from the predetermined polarity, generate a second control signal, the second control signal being configured to control the switching module to reverse the polarity of the data signal.

In some embodiments, the detection module may be further configured to: in response to the polarity of the DC voltage being inverted from the predetermined polarity and a voltage difference associated with the DC voltage being greater than a threshold, generate the second control signal.

In some embodiments, the switching module may be further configured to: upon receiving the first control signal, maintain the polarity of the data signal as received and upon receiving the second control signal, reverse the polarity of the data signal.

In some embodiments, the first control signal may be a relatively high-level voltage, and the second control signal may be a relatively low-level voltage or a ground signal.

In some embodiments, the second control signal may be a relatively high-level voltage, and the first control signal may be a relatively low-level voltage or a ground signal.

In some embodiments, the detection module may include a voltage-regulator tube and an optical coupler device. The voltage-regulator tube may include a first cathode and a first anode. The optical coupler device may include a light emitting device and a light receiving device.

In some embodiments, the light emitting device may include a light-emitting diode. The light-emitting diode may include a second cathode and a second anode, wherein the first anode may be in connection with the second anode.

In some embodiments, the light receiving device may include a phototransistor.

In some embodiments, the detection module may include a comparator.

In some embodiments, the switching module may include one or more switches configured to switch a pair of lines that transmit the received data signal.

In some embodiments, the switching module may include a double-pole four-throw switch.

In some embodiments, the switching module may include two single-pole double-throw switches.

In some embodiments, the polarity correction circuit is integrated in the powered device.

According to another aspect of the present disclosure, a polarity correction circuit is provided. The polarity correction circuit may include a detection module and a switching module. The detection module may be configured to detect a polarity of a DC voltage, the DC voltage being supplied by a first device and transmitted via a pair of a twisted pair cable to a second device. The switching module may be configured to receive a data signal transmitted from the second device and adapt a polarity of the data signal based on the polarity of the DC voltage such that the polarity of the data signal is accordant with the polarity of the DC voltage.

In some embodiments, the first device may be a power sourcing equipment (PSE), and the second device may be a powered device (PD).

In some embodiments, the polarity correction circuit may be in integrated in the second device.

In some embodiments, the pair of the twisted pair cable may connect the first device and the second device.

In some embodiments, the data signal may be transmitted via the pair of the twisted pair cable to the first device after adaptation.

In some embodiments, the first device and the second device may be connected via a transformer.

In some embodiments, the polarity correction circuit may be integrated in the transformer.

In some embodiments, the detection module may be configured to detect the polarity of the DC voltage by detecting a voltage difference on two lines that transmit the DC voltage to the second device.

In some embodiments, the detection module may be further configured to generate one or more control signals based on the voltage difference.

In some embodiments, the switching module may be further configured to receive the one or more control signals.

In some embodiments, the switching module may be further configured to adapt the polarity of the data signal based on the one or more control signals.

According to another aspect of the present disclosure, a powered device is provided. The powered device may include a load circuit configured to collect a data signal. The powered device may include a bridge circuit configured to rectify a polarity of a DC voltage supplied to the load circuit. The powered device may also include a polarity correction circuit configured to adapt a polarity of the data signal based on the polarity of the DC voltage. The polarity correction circuit may include a detection module and a switching module. The detection module may be configured to detect the polarity of a DC voltage transmitted to a powered device and generate one or more control signals based on the polarity of the DC voltage. The switching module may be configured to receive the one or more control signals and a data signal transmitted from the powered device and adapt a polarity of the data signal based on the one or more control signals such that the polarity of the data signal is accordant with the polarity of the DC voltage.

In some embodiments, the bridge circuit may include an input terminal, a rectifier bridge, and an output terminal. The input terminal may be configured to couple to a Power over Ethernet (PoE) network and receive the DC voltage from a power sourcing equipment (PSE). The output terminal may be used for carrying a rectified version of the DC voltage.

According to another aspect of the present disclosure, a transformer is provided. The transformer may connect a powered device (PD) and a power sourcing equipment (PSE) of a Power over Ethernet (PoE) network. The transformer may include a polarity correction circuit configured to adapt a polarity of a data signal transmitted from the powered device. The polarity correction circuit may connect with a connection interface of the powered device. The polarity correction circuit may include a detection module and a switching module. The detection module may be configured to detect the polarity of a DC voltage transmitted to the powered device and generate one or more control signals based on the polarity of the DC voltage. The switching module may be configured to receive the one or more control signals and a data signal transmitted from the powered device and adapt a polarity of the data signal based on the one or more control signals such that the polarity of the data signal is accordant with the original polarity of the DC voltage.

In some embodiments, the transformer may further include a signal conversion module configured to convert an input differential-mode voltage to an output common-mode voltage.

According to another aspect of the present disclosure, a method for adapting a polarity of a data signal is provided. The method may include detecting a polarity of a DC voltage transmitted to a powered device; generating one or more control signals based on the polarity of the DC voltage; receiving a data signal transmitted from the powered device; and adapting a polarity of the data signal based on the one or more control signals such that the polarity of the data signal is accordant with the polarity of the DC voltage.

In some embodiments, the detecting of the polarity of the DC voltage transmitted to the powered device may include detecting a voltage difference on two lines that transmit the DC voltage to the powered device.

In some embodiments, the generating of the one or more control signals based on the polarity of the DC voltage may include generating the one or more control signals based on the voltage difference.

In some embodiments, the method may further include generating a first control signal in response to the polarity of the DC voltage being accordant with a predetermined polarity. The first control signal may be configured to cause the polarity of the data signal to be maintained as received.

In some embodiments, the method may further include generating a second control signal in response to the polarity of the DC voltage being inverted from the predetermined polarity. The second control signal may be configured to cause the polarity of the data signal to be reversed.

In some embodiments, the method may further include generating the second control signal in response to the polarity of the DC voltage being inverted from the predetermined polarity and the voltage difference being greater than a threshold.

According to another aspect of the present disclosure, a Power over Ethernet (PoE) system is provided. The PoE system may include a powered device (PD), a power sourcing equipment (PSE), and a polarity correction circuit. The PSE may be configured to provide power over a twisted pair cable to the powered device. The polarity correction circuit may be configured to adapt a polarity of a data signal transmitted from the powered device. The polarity correction circuit may include a detection module and a switching module. The detection module may be configured to detect a polarity of a DC voltage, the DC voltage being supplied by the PSE and transmitted via a pair of a twisted pair cable to the PD. The switching module may be configured to receive a data signal transmitted from the PD and adapt the polarity of the data signal based on the polarity of the DC voltage such that the polarity of the data signal is accordant with the polarity of the DC voltage.

In some embodiments, the pair of the twisted pair cable may connect the PSE and the PD.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1A:
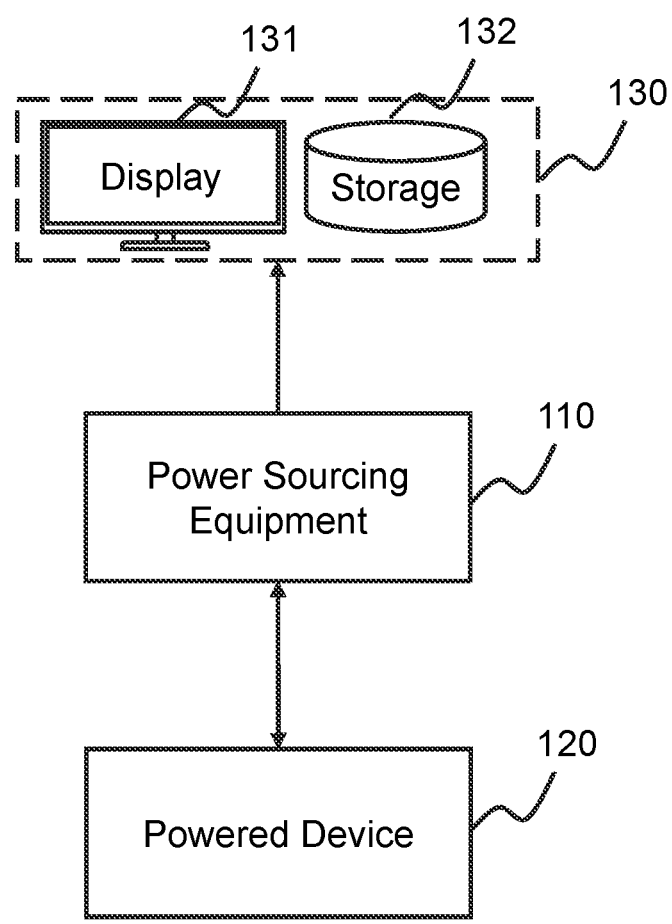
FIGS. 1A and 1B are schematic diagrams illustrating exemplary PoE systems according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that the term "system," "unit," "module," and/or "block" used herein are one method to distinguish different components, elements, parts, section or assembly of different level in ascending order. However, the terms may be displaced by another expression if they achieve the same purpose.

It will be understood that when a unit, engine, module or block is referred to as being "on", "connected to", or "coupled to", another unit, engine, module, or block, it may be on, connected or coupled to, or communicate with the other unit, engine, module, or block, or an intervening unit, engine, module, or block may be present, unless the context clearly indicates otherwise.

The modules (or units, blocks, units) described in the present disclosure may be implemented as hardware modules and/or circuits. The modules or computing device functionality described herein are preferably implemented as hardware modules and/or circuits, but can be software modules as well. In general, the modules described herein refer to logical modules that can be combined with other modules or divided into units despite their physical organization.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The present disclosure provided herein relates to systems and method for adapting a polarity of a data signal. Regardless of whether the single pair of lines connecting a PSE and a PD of a (E)PoE system is connected correctly or not, the polarity of the data signal can be adapted to the (E)PoE system. The adaptation of the data signal can be realized by using a polarity correction circuit. In some embodiments, the polarity correction circuit can be built in the PD of the (E)PoE system. In some embodiments, the polarity correction circuit can be built in a transformer connected between the PSE and the PD. In some embodiments, whether the single pair of lines connecting the PSE and the PD is connected correctly or not can be determined based on a polarity of a DC voltage transmitted to the PD (e.g., an input of a bridge circuit of the PD). In response to a determination that the single pair of lines connecting the PSE and the PD is not connected correctly, a switching module of the polarity correction circuit may reverse the polarity of the data signal received from the PD. After the polarity of the data signal is adapted, the data signal with an adapted polarity may be transmitted from the PD to the PSE. The PSE may receive the data signal with the adapted polarity, and analyze the data signal correctly.

Figure 1B:
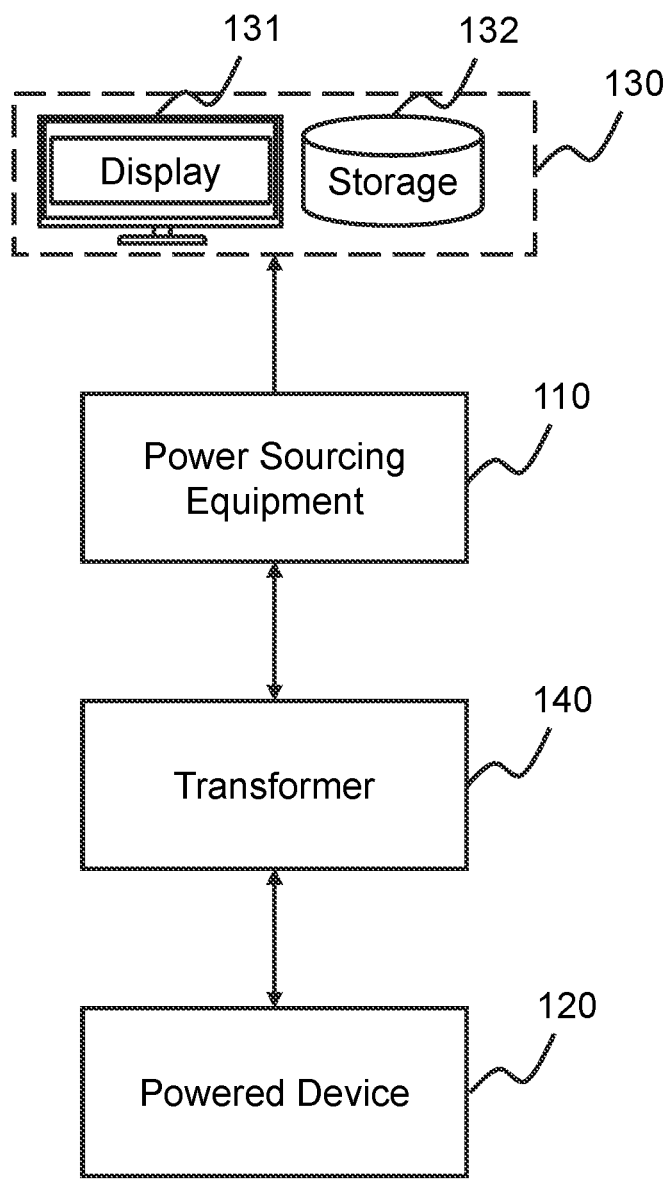

FIGS. 1A and 1B are schematic diagrams illustrating exemplary PoE systems according to some embodiments of the present disclosure. The PoE system 100a or 100b may include a power sourcing equipment (PSE) 110, a powered device (PD) 120, and a network cable connecting the PSE 110 and the PD 120.

The PSE 110 may be used to manage a power supply process in the PoE system 100a or 100b. In some embodiments, the PSE 110 may supply electric power to the PD 120. The electric power may be transmitted via the network cable. In some embodiments, the electric power may be transmitted over two pairs of lines in the network cable. For a single-pair Ethernet, the electric power may be transmitted over one pair of lines in the network cable. The one pair of lines may also transmit signals from the PSE 110 to the PD 120 and/or from the PD 120 to the PSE 110. In some embodiments, the PSE 110 may be a device such as a network switch (i.e., a PoE network switch) that may supply power to one or more powered devices. The electric power may be a direct current signal (DC signal). The voltage of the DC signal may have any suitable value.

In some embodiments, the PSE 110 may send one or more control signals to the PD 120. The control signals may be used to control the operation of the PD 120, e.g., control the power up of the PD 120.

In some embodiments, the PSE 110 may also receive a data signal from the PD 120. The data signal may include a network signal, a video signal, an image signal, an audio signal, or the like, or any combination thereof. For example, if the PD 120 is an IP camera, the data signal may include a video signal and/or an image signal. In some embodiments, the data signal received by the PSE 110 may be processed by the PSE 110. In some embodiments, the data signal received and/or processed by the PSE 110 may be transmitted to a terminal 130. The terminal 130 may include a display 131, a storage 132, etc. The display 131 may display the received signals. The storage 132 may store the received signals. In some embodiments, the terminal 130 may also include a processing device for further processing the data received by the PSE 110, a network switch for switching the data received by the PSE 110, a router for routing the data received by the PSE 110, or the like.

The PD 120 may be a device powered by the PSE 110 and may consume electric power. For example, the PD 120 may receive electric power from the PSE 110. In some embodiments, the PD 120 may be a terminal device of the PoE system 100a or 100b. The PD 120 may include an IP phone, a Voice over Internet Protocol (VoIP) phone, a notebook computer, an IP camera, a Wireless Local Area Network access point, a network router, an IPTV decoder, or the like, or a combination thereof.

In some embodiments, if the PSE 110 and the PD 120 support the same transmission mode (e.g., a common-mode transmission, a differential-mode transmission), the PSE 110 and the PD 120 may be connected via a network cable as shown in FIG. 1A.

The network cable may transmit electric power and data signals from the PSE 110 to the PD 120, and/or transmit data signals from the PD 120 to the PSE 110. The network cable connecting the PSE 110 and the PD 120 may include a twisted pair cable, a coaxial cable, an optical fiber cable, or the like. The twisted pair cable may include a shielded twisted pair (STP) cable, an unshielded twisted pair (UTP) cable, or the like. The twisted pair cable may include a Category-5 cable, a Category-5e cable, a Category-6 cable, etc. The coaxial cable may be an RG-6 coaxial cable, a 75-5 coaxial cable, an RG-59 coaxial cable, an RG-58 coaxial cable, an RG-62 coaxial cable, an RG-7 coaxial cable, an RG-11 coaxial cable, or the like, or a combination thereof. The optical fiber cable may include a silica fiber cable, a fluorine doped fiber cable, a compound fiber cable, a fluoride fiber cable, a plastic optical fiber cable, or the like, or any combination thereof.

Figure 4:
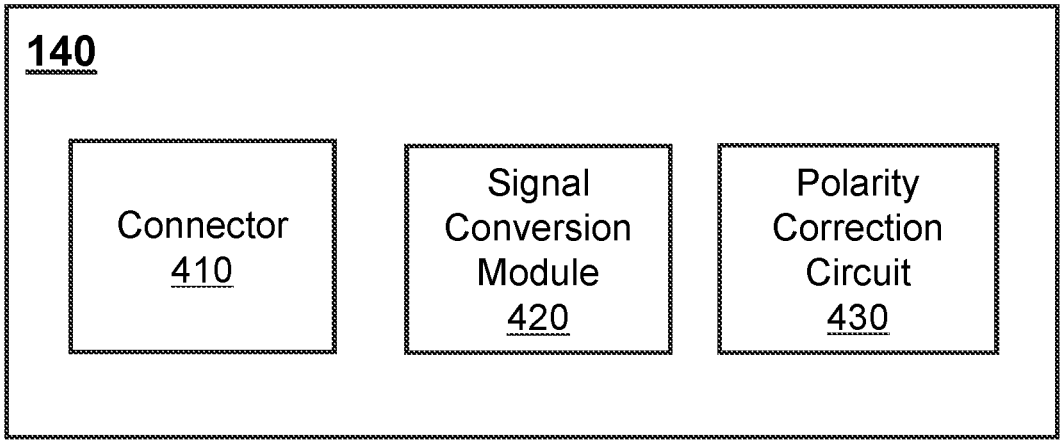
FIG. 4 is a schematic diagram illustrating an exemplary transformer according to some embodiments of the present disclosure.

In some embodiments, if the PSE 110 and the PD 120 support different transmission modes, the transmission of power and/or data signals between the PSE 110 and the PD 120 may be realized via a transformer 140 as shown in FIG. 1B. FIG. 4 is a schematic diagram illustrating an exemplary transformer according to some embodiments of the present disclosure. The transformer 140 may include a connector 410 and a signal conversion module 420.

The connector 410 may be configured to provide one or more interfaces to connect with the PSE 110 and/or the PD 120. The connector 410 may include an RJ45 connector, an RJ11 connector, an SC fiber connector, an FDDI connector, an attachment unit interface (AUI) connector, a console connector, or the like, or a combination thereof.

In some embodiments, the signal conversion module 420 may convert an input common-mode voltage to an output differential-mode voltage. In some embodiments, the signal conversion module 420 may convert an input differential-mode voltage to an output common-mode voltage. In some embodiments, the signal conversion module 420 may include one or more circuits configured to transform the signals transmitted between the PSE 110 and the PD 120, so that the communication between the PSE 110 and the PD 120 can be successfully realized.

In some embodiments, the transformer 140 may further include a polarity correction circuit 430. More descriptions about the polarity correction circuit 430 may be found elsewhere in the present disclosure (e.g., FIG. 5 and the description thereof).

Through the transformer 140, the PSE 110 and the PD 120 may communicate with each other successfully. The connection between the PSE 110 and the transformer 140 may be realized using a first network cable. The connection between the PD 120 and the transformer 140 may be realized using a second network cable. The first network cable connecting the PSE 110 and the transformer 140 and the second network cable connecting the PD 120 and the transformer 140 may be in the same type or in different types. The network cable may include a twisted pair cable, a coaxial cable, an optical fiber cable, or the like. The twisted pair cable may include a shielded twisted pair (STP) cable, an unshielded twisted pair (UTP) cable, or the like. The twisted pair cable may include a Category-5 cable, a Category-5e cable, a Category-6 cable, etc. The coaxial cable may be an RG-6 coaxial cable, a 75-5 coaxial cable, an RG-59 coaxial cable, an RG-58 coaxial cable, an RG-62 coaxial cable, an RG-7 coaxial cable, an RG-11 coaxial cable, or the like, or a combination thereof. The optical fiber cable may include a silica fiber cable, a fluorine doped fiber cable, a compound fiber cable, a fluoride fiber cable, a plastic optical fiber cable, or the like, or any combination thereof. In some embodiments, if the electric power is transmitted from the PSE 110 to the transformer in common mode and transmitted from the transformer to the PD 120 in differential mode, then two pairs of lines in the first network cable may be used to connect the PSE 110 and the transformer, and a single pair of lines in the second network cable may be used to connect the transformer and the PD 120. In some embodiments, if the electric power is transmitted from the PSE 110 to the transformer in differential mode and transmitted from the transformer to the PD 120 in common mode, then a single pair of lines in the first network cable may be used to connect the PSE 110 and the transformer, and two pairs of lines in the second network cable may be used to connect the transformer and the PD 120.

Figure 2:
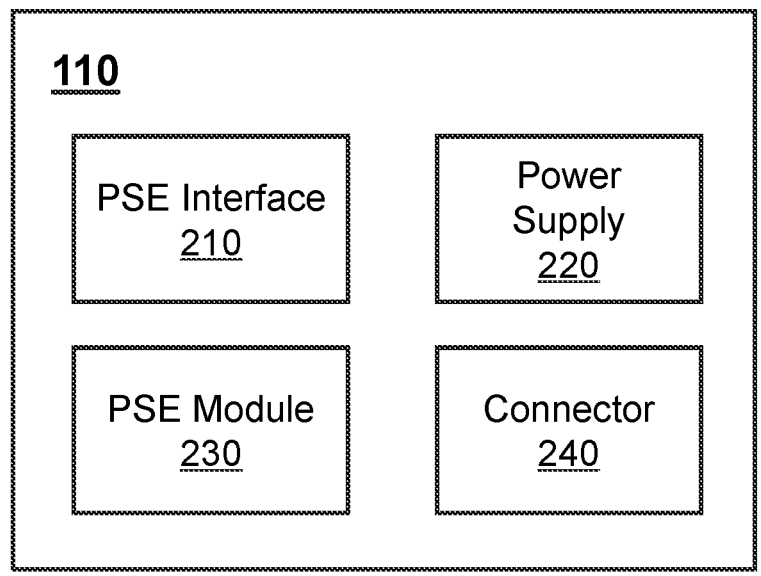
FIG. 2 is a schematic diagram illustrating an exemplary PSE according to some embodiments of the present disclosure.

FIG. 2 is a schematic diagram illustrating an exemplary PSE according to some embodiments of the present disclosure. The PSE 110 may include a PSE interface 210, a power supply 220, a PSE module 230, and/or a connector 240.

The PSE interface 210 may provide a communication interface for one or more terminals. The PSE interface 210 may receive data and/or information from the terminal(s), and/or send data and/or information to the terminal(s). The terminal(s) may include a display, a storage, a processing device, a network switch, a router, etc. The PSE interface 210 may include an RJ45 connector, an RJ11 connector, a SC fiber connector, an FDDI connector, an attachment unit interface (AUI) connector, a console connector, or the like, or a combination thereof. In some embodiments, the PSE interface 210 may communication with the PD 120 via the connector 240. In some embodiments, the PSE interface 210 may include one or more signal processing units (e.g., signal demodulation circuit(s), or the like) configured to process the data and/or information. For example, if the PSE 110 receives a modulated signal from the PD 120, then the PSE interface 210 may demodulate the signal, and/or send the demodulated signal to the terminal(s).

Figure 7:
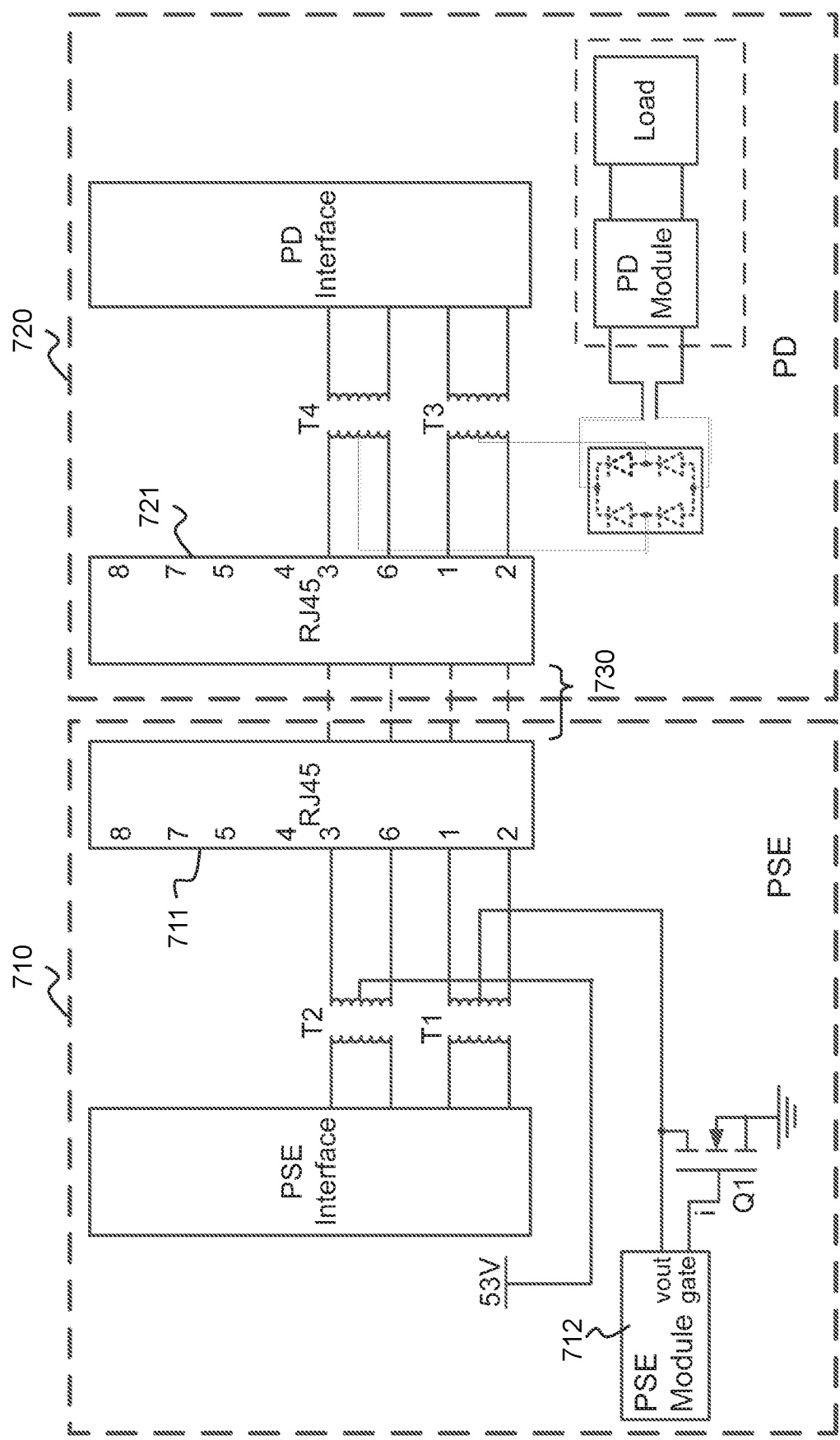
FIG. 7 illustrates a PoE system when the power supply is in a common-mode.
Figure 8:
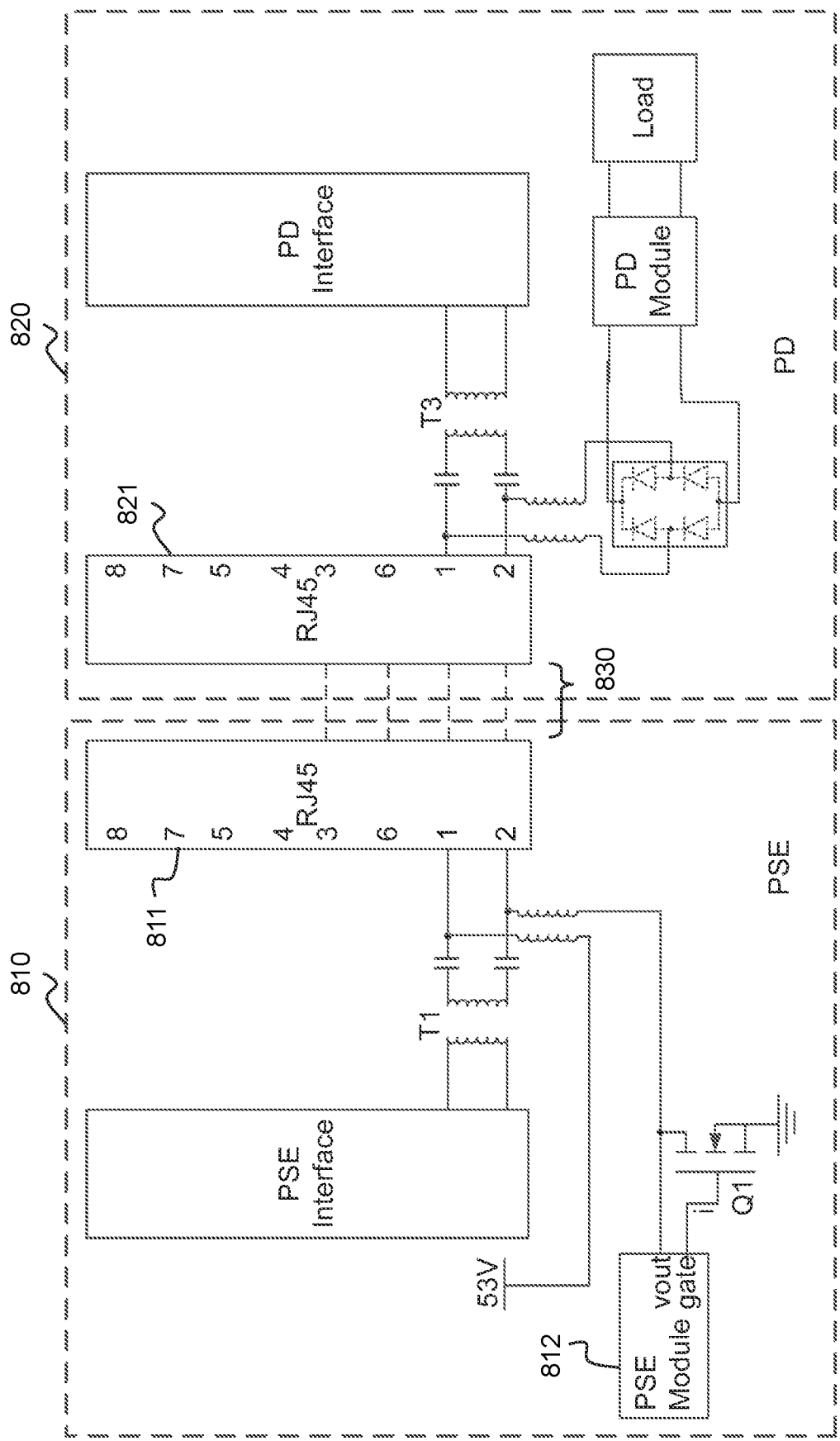
FIG. 8 illustrates a PoE system when the power supply is in a differential-mode.

The power supply 220 may provide power (e.g., a DC voltage/current signal) to the PSE 110 (e.g., the PSE module 230). The PSE module 230 may include a PSE control circuitry configured to control one or more operations of the PSE 110 (e.g., the detection and classification of one or more PDs during the power up of the PoE system 100a or 100b). In some embodiments, the PSE module 230 may control the application of the DC signal to one line of the single pair of lines in the network cable connecting the PSE 110 and a PD. In some embodiments, the PSE module 230 may control the application of a ground signal to the other line of the single pair of lines in the network cable connecting the PSE 110 and the PD. For example, as shown in FIG. 8, the PSE module 812 may control the application of a DC voltage of 53 V to line 1 of the pair of lines 1 and 2 of the network cable 830 and control the application of a ground signal to line 2 of the pair of lines 1 and 2 of the network cable 830. In some embodiments, the PSE module 230 may control the application of the DC signal to a pair of two lines in the network cable. In some embodiments, the PSE module 230 may control the application of a ground signal to another pair of two lines in the network cable. For example, as shown in FIG. 7, the PSE module 712 of the PSE 710 may control the application of a DC voltage of 53 V to the pair of lines 3 and 6 of the network cable 730 and control the application of a ground signal to the pair of lines 1 and 2 of the network cable 730.

The connector 240 may be configured to facilitate the connection of the PSE 110 to one or more PDs and/or one or more transformers. In some embodiments, the connector 240 may include an RJ45 connector (e.g., the network connector 711 of the PSE 710, the network connector 811 of the PSE 810, or the like).

Figure 3A:
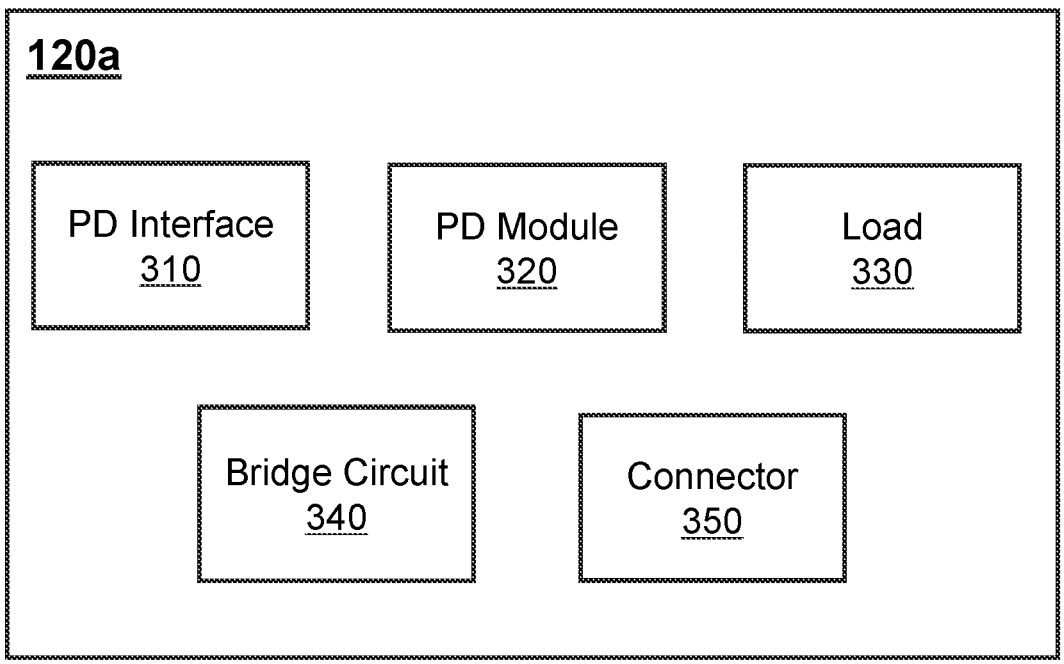
FIG. 3A is a schematic diagram illustrating an exemplary PD according to some embodiments of the present disclosure.
Figure 3B:
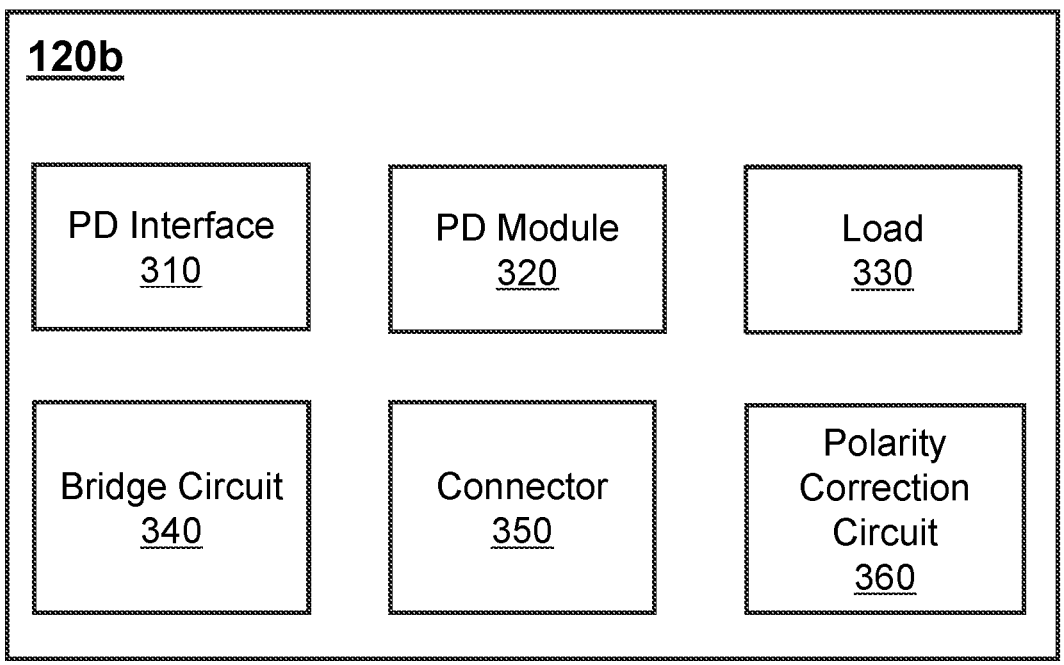
FIG. 3B is a schematic diagram illustrating another exemplary PD according to some embodiments of the present disclosure.

FIG. 3A is a schematic diagram illustrating an exemplary PD according to some embodiments of the present disclosure. FIG. 3B is a schematic diagram illustrating another exemplary PD according to some embodiments of the present disclosure. The PD 120a or 120b may include a PD interface 310, a PD module 320, a load 330, a bridge circuit 340, and a connector 350. In some embodiments, the PD 120b may further include a polarity correction circuit 360.

The PD interface 310 may provide a communication interface for the load 330 of the PD 120a or 120b. In some embodiments, the PD interface 310 may receive data and/or information from the load 330 and/or send the data and/or information to the PSE 110. In some embodiments, the PD interface 310 may communication with the PSE 110 via the connector 350. In some embodiments, the PD interface 310 may include one or more signal processing units (e.g., signal modulation circuit(s), or the like) configured to process the data and/or information. For example, the PD interface 310 may modulate the signals received from the load 330, and transmit the modulated signal to the PSE 110.

The PD module 320 may include one or more circuits used in one or more operations associated with the detection and/or classification of the PD 120a or 120b performed by the PSE 110. In some embodiments, the PD module 320 may present a variable resistance. If different voltages are applied to the PD module 320, the PD module 320 may present different resistances.

The load 330 may be configured to detect or collect signals, or maintain one or more functions of the PD 120a or 120b. The load 330 may consume electric power. In some embodiments, the load 330 may include one or more electricity consuming elements of the PD 120a or 120b. An exemplary load may include an IP phone, a Voice over Internet Protocol (VoIP) phone, a notebook computer, an IP camera, a Wireless Local Area Network access point, a network router, an IPTV decoder, or the like. In some embodiments, the load 330 may be integrated in the PD 120a or 120b. In some embodiments, the load 330 may be configured as a separate device, and the load 330 and the PD 120a or 120b may be connected by one or more external cables that transmit power from the PD 120a or 120b to the load 330 and transmit data signals between the load 330 and the PD 120a or 120b.

The bridge circuit 340 may be configured to rectify a polarity of a DC voltage supplied to the load 330. No matter what the polarity of the DC voltage input to the bridge circuit 340, the polarity of the DC signal output by the bridge circuit 340 is the same (e.g., the same as a predetermined polarity). In some embodiments, the predetermined polarity may be predefined in a communication protocol of the PSE 110 and the PD 120a or 120b. The bridge circuit 340 may include an input terminal. The input terminal may be configured to couple to a PoE network and receive the DC voltage from a PSE (e.g., the PSE 110). In some embodiments, the bridge circuit 340 may also include a rectifier bridge. The rectifier bridge may include a diode bridge that may include four or more diodes in the bridge circuit configuration. The bridge circuit 340 may further include an output terminal for carrying a rectified version of the DC voltage. Merely by way of example, if the single pair of lines in the network cable connecting the PSE 110 and the PD 120a or PD 120b is connected correctly, the polarity of the DC voltage input to the bridge circuit 340 may be the same as the predetermined polarity, the bridge circuit 340 may maintain the polarity of the DC voltage, and accordingly the polarity of the DC signal output by the bridge circuit 340 are also the same as the predetermined polarity. As another example, if the single pair of lines in the network cable connecting the PSE 110 and the PD 120a or PD 120b is cross connected, the polarity of the DC voltage input to the bridge circuit 340 may be reversed from the predetermined polarity, the bridge circuit 340 may reverse the polarity of the DC voltage, and accordingly the polarity of the DC signal output by the bridge circuit 340 are the same as the predetermined polarity.

The connector 350 may be configured to facilitate the connection of the PD 120a or 120b to a PSE and/or one or more transformers. An exemplary connector of the PD 120a or 120b may be found in FIGS. 7-10 (e.g., the connector 910 illustrated in FIG. 9A, the connector 1010 illustrated in FIG. 10, or the like). In some embodiments, the connector 350 may include an RJ45 connector (e.g., the network connector 721 of the PD 720, the network connector 821 of the PD 820, the RJ45 connector 952 of the PD 950, or the like).

In some embodiments, the PD 120b may further include a polarity correction circuit 360 as shown in FIG. 3B. In some embodiments, the polarity correction circuit 360 may be configured to detect a polarity of a DC voltage transmitted to the PD 120b. In some embodiments, the polarity correction circuit 360 may be configured to adapt a polarity of a data signal from the PD 120b such that the polarity of the data signal is accordant with the polarity of the DC voltage. More description about the polarity correction circuit 360 may be found elsewhere in the present disclosure (e.g., FIG. 5 and the description thereof).

Figure 9A:
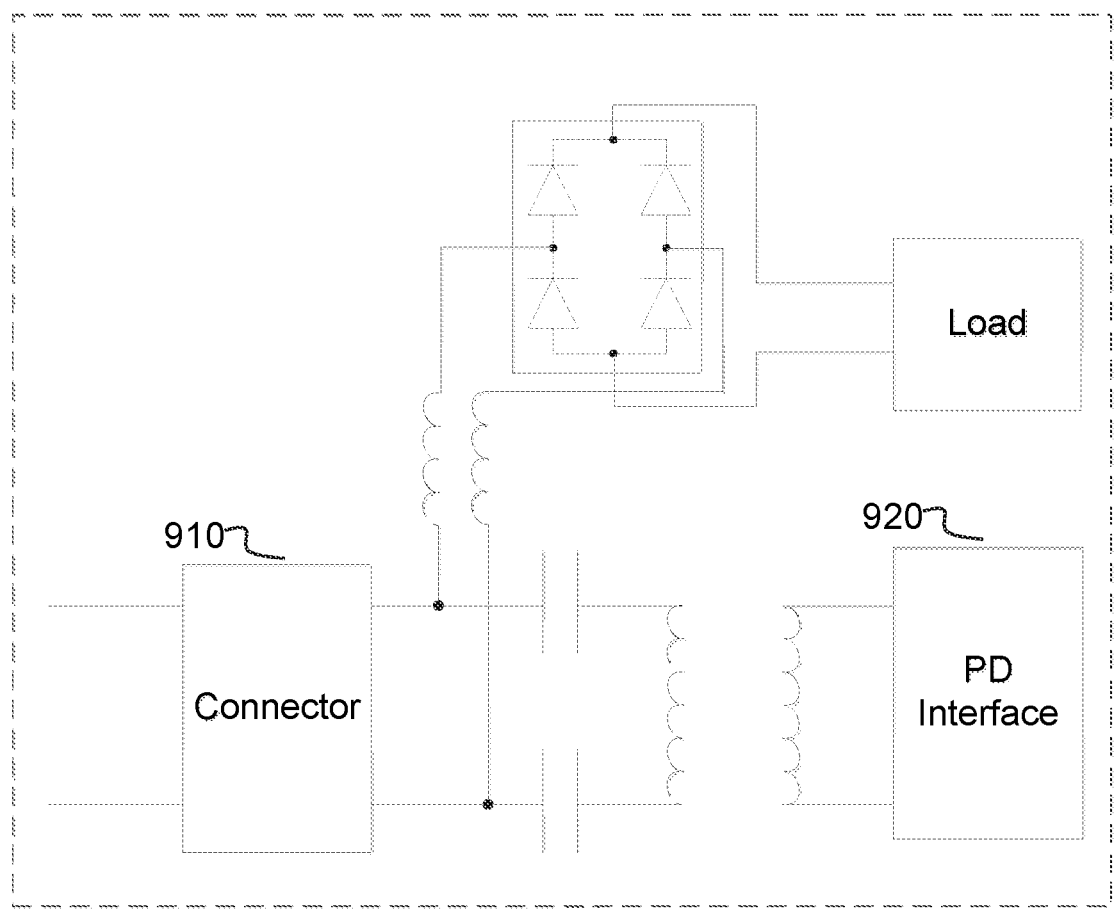
FIGS. 9A and 9B illustrates exemplary PDs according to some embodiments of the present disclosure.

In some embodiments, as shown in FIG. 9A, in a single-pair Ethernet, the PD120a or 120b may support differential-mode power supply.

Figure 9B:
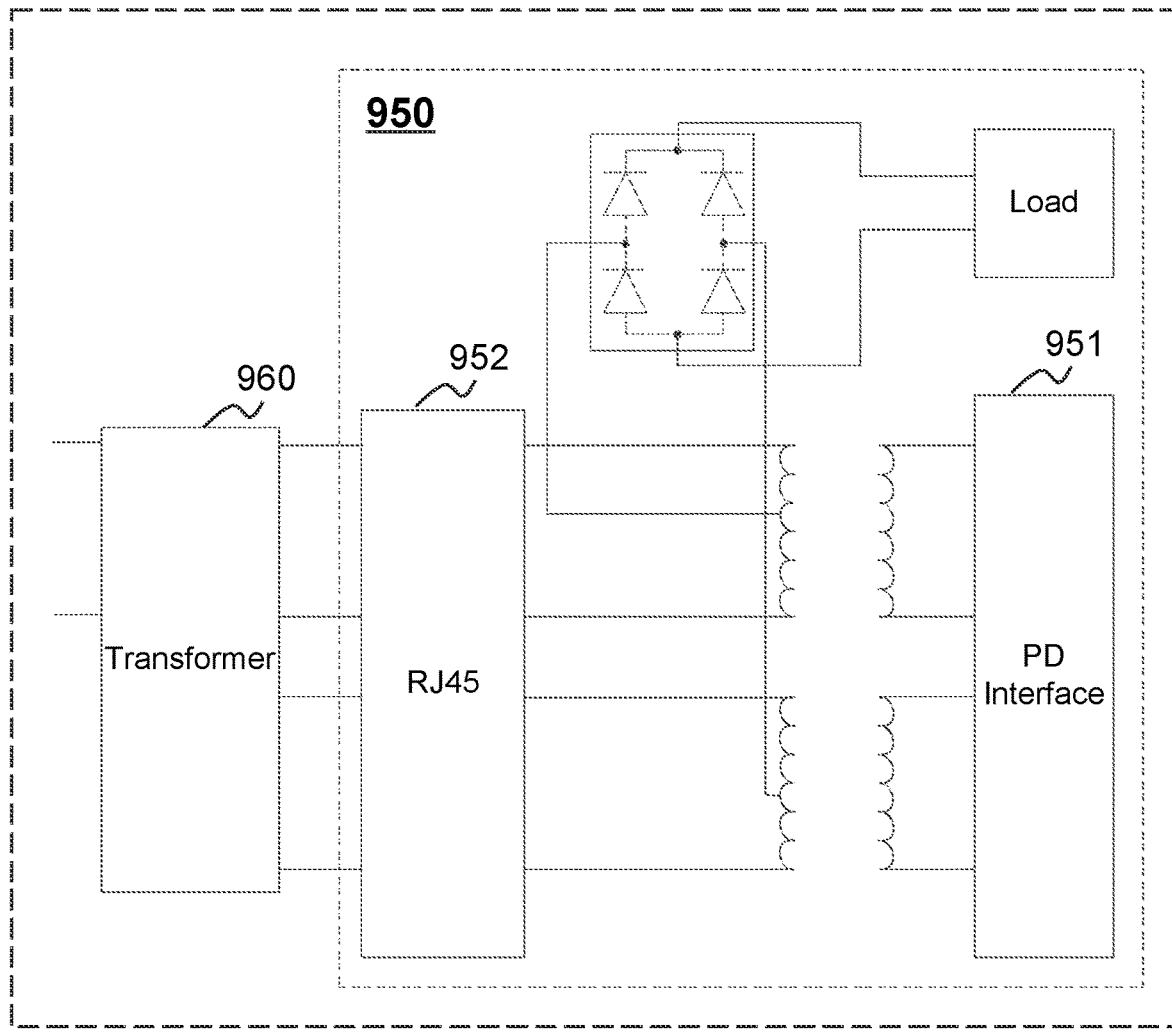

In some embodiments, the PD 120a or 120b may be configured as a built-in PD or an external PD. The built-in PD may refer to a powered device having a built-in connector and/or a PD interface that support a single-pair Ethernet. The external PD may refer to a powered device cooperating with an external transformer that support a single-pair Ethernet. FIG. 9A shows an exemplary built-in PD according to some embodiments of the present disclosure. The built-in PD 900 may include a connector 910 and a PD interface 920. The built-in PD 900 may support differential-mode power supply, and the connector 910 and/or the PD interface 920 may support the single-pair Ethernet. The communication between the PSE 110 and the built-in PD 900 may be realized by a single pair of lines in the network cable connecting the connector 240 of the PSE 110 and the connector 910 of the built-in PD 900. The connector 910 may receive power and data from the single pair of lines of the network cable and may transmit the power and data to one or more components of the built-in PD 900 via a single pair of lines set inside the built-in PD 900. The connector 910 may be any suitable connector, e.g., an RJ45 connector, an RJ11 connector, a SC fiber connector, an FDDI connector, an attachment unit interface (AUI) connector, a console connector, etc. FIG. 9B shows an exemplary external PD according to some embodiments of the present disclosure. The external PD 950 may include a PD interface 951 and a connector 952. The PD interface 951 may communicate with the PSE 110 through one or two pairs of lines. The external PD 900 may support common-mode power supply, and the connector 910 and/or the PD interface 920 may not directly support the single-pair Ethernet. Therefore, an external transformer 960 may be used to cooperate with the external PD 900 so that the external PD 900 can support the single-pair Ethernet. In some embodiments, the external transformer 960 may convert the differential-mode power supply into the common-mode power supply. In some embodiments, if the PD interface 951 is incompatible with the PSE interface 210 of the PSE 110, the external transformer 960 may transform the signals transmitted between the PSE 110 and the PD 120a or 120b. More descriptions of the external transformer 960 may be found elsewhere in the present disclosure (e.g., FIG. 4 and the description thereof).

Figure 5:
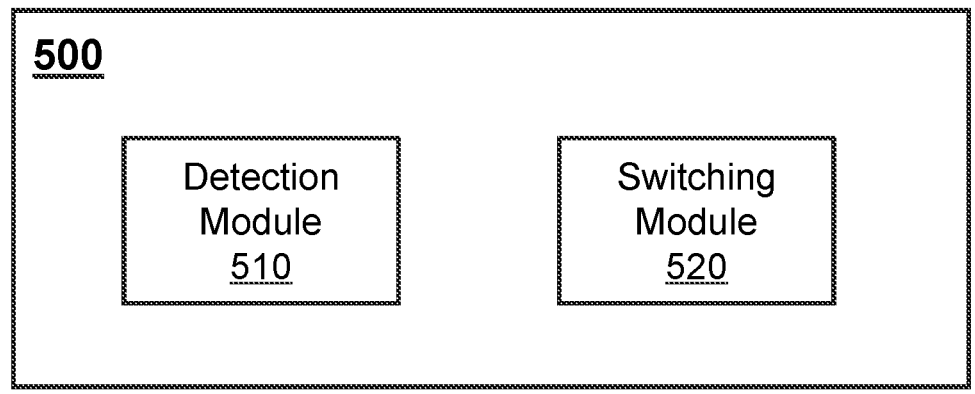
FIG. 5 is a schematic diagram illustrating an exemplary polarity correction circuit according to some embodiments of the present disclosure.

FIG. 5 is a schematic diagram illustrating an exemplary polarity correction circuit according to some embodiments of the present disclosure. The polarity correction circuit 500 may include a detection module 510 and a switching module 520. An exemplary configuration of the polarity correction circuit 500 may be referred to the polarity correction circuit 1020 shown in FIG. 10.

In some embodiments, the detection module 510 may be configured to detect a polarity of a DC voltage transmitted from a PSE (e.g., the PSE 110) or to a powered device (e.g., the PD 120a or 120b). In some embodiments, the detection module 510 may be configured to generate one or more control signals based on the polarity of the DC voltage. In some embodiments, the detection module 510 may generate a first control signal in response to the polarity of the DC voltage being accordant with a predetermined polarity. The first control signal may be configured to control the switching module 520 to maintain the polarity of the data signal(s) as received. In some embodiments, the detection module 510 may generate a second control signal in response to the polarity of the DC voltage being inverted from the predetermined polarity. The second control signal may be configured to control the switching module 520 to reverse the polarity of the data signal(s). In some embodiments, the detection module 510 may further determine a voltage difference associated with the DC voltage. In some embodiments, the detection module 510 may detect the polarity of the DC voltage by detecting the voltage difference. In some embodiments, if the polarity of the DC voltage is inverted from the predetermined polarity and the voltage difference is greater than a threshold, the detection module 510 may generate the second control signal. An exemplary configuration of the detection module 510 may be referred to the detection module 1021 shown in FIG. 10. In some embodiments, the detection module 510 may include a comparator or an operational amplifier.

In some embodiments, the switching module 520 may be configured to receive the one or more control signals. In some embodiments, the switching module 520 may be configured to receive one or more data signals transmitted from the powered device. In some embodiments, the switching module 520 may be configured to adapt a polarity of the data signal(s) based on the one or more control signals such that the polarity of the data signal is accordant with the polarity of the DC voltage. In some embodiments, the switching module 520 may maintain the polarity of data signal as received upon receiving the first control signal. In some embodiments, the switching module 520 may reverse the polarity of the data signal upon receiving the second control signal. An exemplary configuration of the switching module 520 may be referred to the switching module 1022 shown in FIG. 10.

Figure 6:
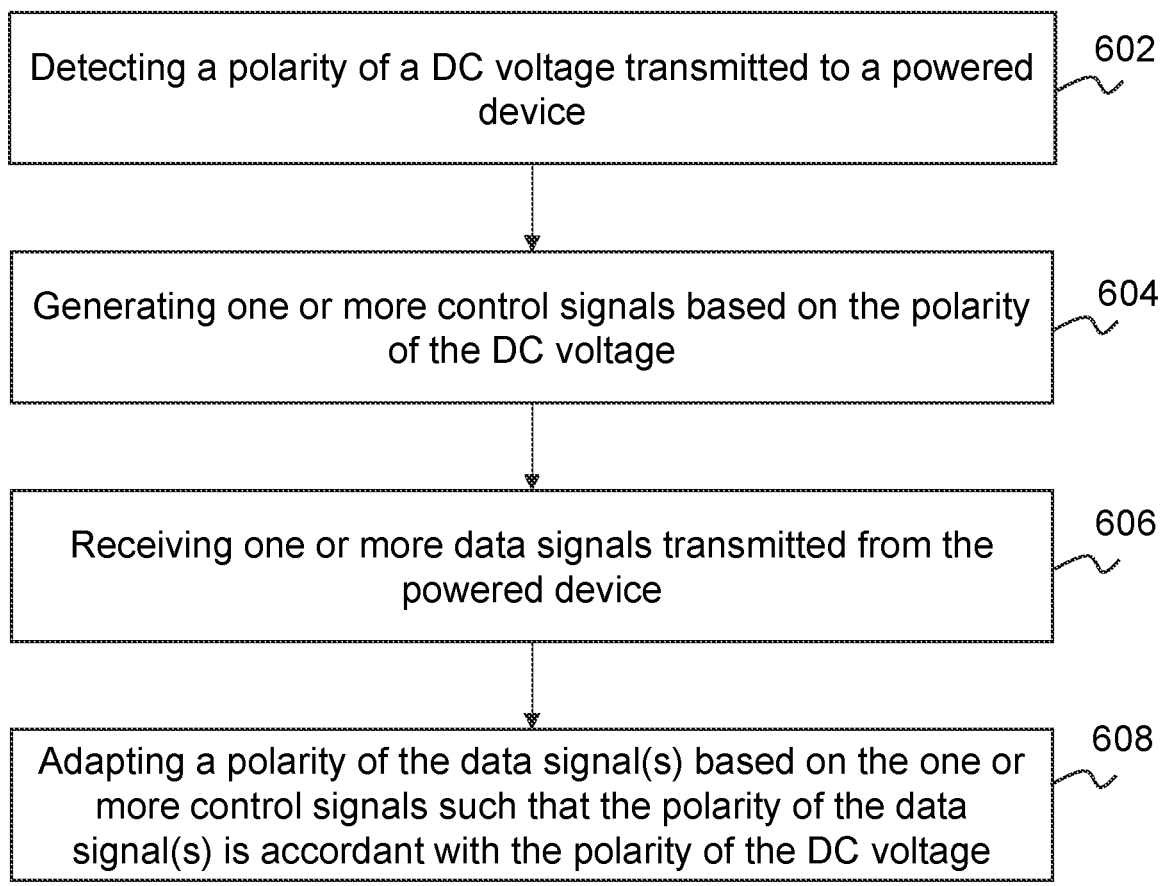
FIG. 6 is a schematic diagram illustrating an exemplary process and/or method of adapting a polarity of a data signal according to some embodiments of the present disclosure.

FIG. 6 is a schematic diagram illustrating an exemplary process and/or method of adapting a polarity of a data signal according to some embodiments of the present disclosure. In some embodiments, the process and/or method 600 may be performed by the polarity correction circuit 500.

Figure 10:
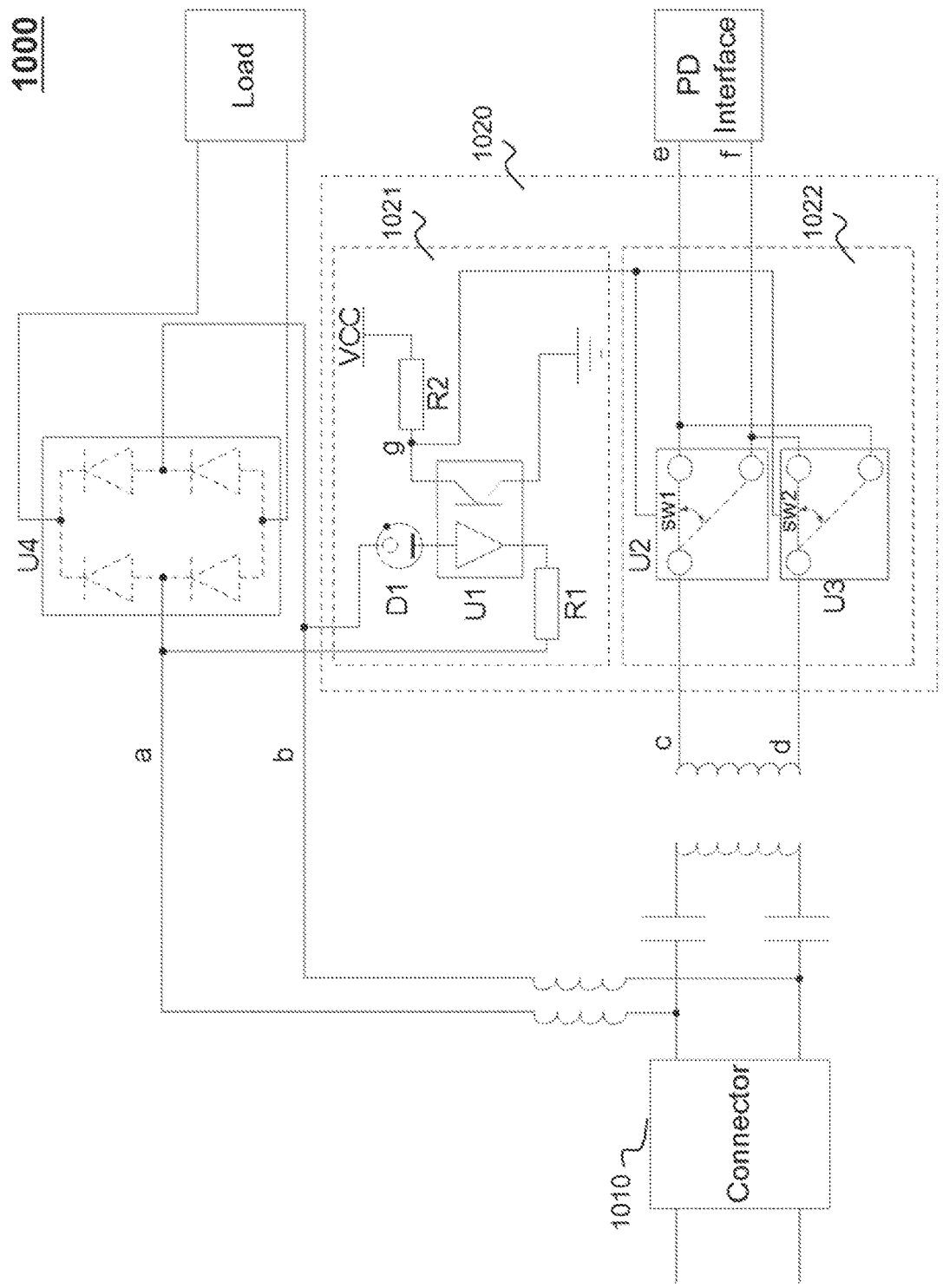
FIG. 10 illustrates another exemplary PD according to some embodiments of the present disclosure.

In 602, the polarity correction circuit 500 (e.g., the detection module 510) may detect a polarity of a DC voltage transmitted to the PD 120. In some embodiments, the detecting of the polarity of the DC voltage transmitted to the PD 120 may be achieved by detecting a voltage difference on two lines that transmit the DC voltage to the PD 120. For example, as shown in FIG. 10, the PD may be supplied with the DC voltage through line a and line b. The detection module 510 may detect the voltage difference on line a and line b. The voltage signals on lines a and b are inputs of the bridge circuit U4. In some embodiments, the voltage difference may be determined by subtracting the voltage on line b from the voltage on line a. If the voltage on line a is larger than or equal to the voltage on line b, the polarity of the DC voltage may be positive; if the voltage on line a is smaller than the voltage on line b, the polarity of the DC voltage may be negative. In some embodiments, the voltage difference may be determined by subtracting the voltage on line a from the voltage on line b. If the voltage on line b is larger than or equal to the voltage on line a, the polarity of the DC voltage may be positive; if the voltage on line b is smaller than the voltage on line a, the polarity of the DC voltage may be negative. In some embodiments, the polarity correction circuit 500 may be integrated in the PD 120b, and the detection module 510 may detect the polarity of the DC voltage before the voltage signal is rectified by the bridge circuit 340 of the PD 120b. In some embodiments, the polarity correction circuit 500 may be integrated in the transformer 140, and the detection module 510 may detect the polarity of the DC voltage before the voltage signal is transmitted to the PD 120a.

In 604, the polarity correction circuit 500 (e.g., the detection module 510) may generate one or more control signals based on the polarity of the DC voltage. In some embodiments, if the polarity of the DC voltage is accordant with a predetermined polarity, the detection module 510 may generate a first control signal. The first control signal may be configured to control the switching module 520 to maintain the polarity of the data signal(s) as received. In some embodiments, if the polarity of the DC voltage is inverted from the predetermined polarity, the detection module 510 may generate a second control signal. The second control signal may be configured to control the switching module 520 to reverse the polarity of the data signal(s). In some embodiments, if the polarity of the DC voltage is inverted from the predetermined polarity and the voltage difference associated with the DC voltage (e.g., the absolute value of the voltage difference associated with the DC voltage) is greater than a threshold, the detection module 510 may generate the second control signal.

The predetermined polarity of the DC voltage may be associated with a standard or protocol relating to the communication between the PSE 110 and the PD 120a or 120b (or the connection of the single pair of lines connecting the PSE 110 and the PD 120a or 120b) in the PoE system 100a or 100b. For example, as shown in FIG. 8, a voltage +53V is applied to the pin 1 of the RJ45 connector of the PSE 810, and a relatively low voltage is applied to the pin 2 of the RJ45 connector of the PSE 810. If the pin 1 of the RJ45 connector of the PSE 810 connects with the pin 1 of the RJ45 connector of the PD 820, and the pin 2 of the RJ45 connector of the PSE 810 connects with the pin 2 of the RJ45 connector of the PD 820, it may be definitive that the voltage on line a (an input of the bridge circuit in FIG. 8) is larger than the voltage on line b (another input of the bridge circuit in FIG. 8). For description convenience, the voltage on line a is expressed as Va, the voltage on line b is expressed as Vb, the voltage difference, Va minus Vb is expressed as Vab, and Vb minus Va is expressed as Vba. Therefore, as illustrated in FIG. 10, if the PSE and the PD are connected by the single pair of lines correctly, it may also be definitive that which of the voltage on line a (Va) and the voltage on line b (Vb) in FIG. 10 is relatively high and which of the voltage on line a (Va) and the voltage on line b (Vb) in FIG. 10 is relatively low, i.e., the predetermined polarity of Vab is definitive. If the polarity of Vab detected by the detection module 1021 is accordant with the predetermined polarity of Vab, it may indicate that the PSE and the PD are connected correctly. If the polarity of Vab detected by the detection module 1021 is inverted from the predetermined polarity of Vab, it may indicate that the PSE and the PD are not connected correctly.

As shown in FIG. 10, the detection module 1021 may receive Va and Vb, and Va and Vb may control the status of the voltage-regulator tube D1 and the status of the optical couple device U1. The status of the optical couple device U1 may further influence the voltage on point g (represented as Vg). For example, if the value of the electric current flowing through the optical couple device U1 is larger than or equal to the conduction current of the optical couple device U1 (e.g., 0.001 A), the optical couple device U1 may be conducted and point g is grounded. If the electric current flowing through the optical couple device U1 is smaller than the conduction current of the optical couple device U1, the optical couple device U1 may not be conducted and the voltage on point g (Vg) may be equal to Vcc. The voltages on point g (Vg) corresponding to different status of U1 may be designated as the one or more control signals.

In 606, the polarity correction circuit 500 (e.g., the switching module 520) may receive one or more data signals transmitted from the PD 120a or 120b and the one or more control signals from the detection module 510. In some embodiments, the switching module 520 may receive the data signal(s) through the PD interface 310 of the PD 120a or 120b. In some embodiments, the polarity correction circuit 500 may be integrated in the PD 120b, and the switching module 520 may receive the data signal(s) through the PD interface 310 of the PD 120b. In some embodiments, the polarity correction circuit 500 may be integrated in the transformer 140, and the switching module 520 may receive the data signal(s) through the PD interface 310 of the PD 120a.

In 608, the polarity correction circuit 500 (e.g., the switching module 520) may adapt a polarity of the data signal(s) based on the one or more control signals such that the polarity of the data signal is accordant with the polarity of the DC voltage. If the first control signal is received by the switching module 520, the switching module 520 may maintain the polarity of the data signal(s) as received. If the second control signal is received by the switching module 520, the switching module 520 may reverse the polarity the data signal. After the polarity of the data signal(s) is adapted, the PSE 110 can analyze the data signal(s) correctly. In some embodiments, the polarity correction circuit 500 may be integrated in the PD 120b, and the switching module 520 may adapt the polarity of the data signal(s) received from the load 330 of the PD 120b. In some embodiments, the polarity correction circuit 500 may be integrated in the transformer 140, and the switching module 520 may adapt the polarity of the data signal(s) transmitted from the connector 350 of the PD 120a.

The detection module 1021 shown in FIG. 10 includes the voltage-regulator tube D1 and the optical couple device U1. Electrical isolation may be realized in the PoE system 100a or 100b by using the optical couple device U1. The voltage-regulator tube D1 may include a first cathode and a first anode. The optical couple device U1 may include a light emitting device and a light receiving device. The light emitting device may be a light-emitting diode including a second cathode and a second anode. The light receiving device may include a phototransistor. As illustrated in FIG. 10, the first anode of the voltage-regulator tube D1 may be in connection with the second anode of the light-emitting diode, and the first cathode of the voltage-regulator tube D1 may be in connection with line b.

If the predetermined polarity of Vab is positive, and the detected polarity of Vab is also positive (i.e., the PSE 110 and the PD 120a or 120b are connected correctly), no matter what the value of Vab is, the optical couple device U1 may not be conducted and the voltage on point g (Vg) may be always a relatively high-level voltage (i.e., the first control signal may be a relatively high-level voltage). In this case, Vg may control the switching module 1022 (e.g., the switch units U2 and U3) to maintain the polarity of the data signal(s) as received, e.g., control a switch SW1 to connect with line e and control a switch SW2 to connect with line f.

If the predetermined polarity of Vab is positive, the detected polarity of Vab is negative (i.e., the PSE 110 and the PD 120a or 120b are not connected correctly), the regulation voltage of the voltage-regulator tube D1 is $V_{regulation}$ (e.g., 25 V), the conduction current of the optical couple device U1 is $C_{conduction}$ (e.g., 0.001 A), the conduction voltage of the light-emitting diode of the optical couple device U1 is $V_{conduction}$ (e.g., 0.7 V), the resistances of resistor R1 and resistor R2 are the same (e.g., 1000 ohms), and Vba is smaller than the regulation voltage of the voltage-regulator tube D1 (e.g., 25 V), then the voltage-regulator tube D1 may not be conducted, the optical couple device U1 may also be not conducted, and the voltage on point g may be a relatively high-level voltage (e.g., Vcc). When Vba is relatively small, the PoE system 100a or 100b may be in detection or classification process. If Vba is larger than $C_{conduction}*R1+V_{conduction}+V_{regulation}$ (e.g., 26.7 V), then the optical couple device U1 may be conducted, point g may be grounded, and the voltage on point g (Vg) may be zero (i.e., the second control signal may be a ground signal). In this case (Vg is a relatively low-level voltage, e.g., zero), Vg may control the switching module 1022 (e.g., the switch units U2 and U3) to reverse the polarity of the data signal(s), e.g., control the switch SW1 to connect with line f and control the switch SW2 to connect with line e. After the polarity of the data signal(s) is reversed, the PSE 110 can analyze the data signal(s) correctly. When Vba is equal to or larger than a predetermined value (e.g., a power-supply voltage of the PD 120a or 120b), the PoE system 100a or 100b may be in power supplying process. In some embodiments, the adaptation of the polarity of the data signal(s) may be implemented only in the power supplying process.

If the predetermined polarity of Vab is negative, but the detected polarity of Vab is positive (i.e., the PSE 110 and the PD 120a or 120b are not connected correctly), then no matter what the value of Vab is, the optical couple device U1 may not be conducted, and the voltage on point g (Vg) may be always a relatively high-level voltage (i.e., the second control signal may be a relatively high-level voltage). In this case, Vg may control the switching module 1022 (e.g., the switch units U2 and U3) to reverse the polarity of the data signal(s), e.g., control the switch SW1 to connect with line f and control the switch SW2 to connect with line e. After the polarity of the data signal(s) is reversed, the PSE 110 can analyze the data signal(s) correctly.

If the predetermined polarity of Vab is negative, the detected polarity of Vab is also negative (i.e., the PSE 110 and the PD 120a or 120b are connected correctly), the regulation voltage of the voltage-regulator tube D1 is $V_{regulation}$ (e.g., 25 V), the conduction current of the optical couple device U1 is $C_{conduction}$ (e.g., 0.001 A), the conduction voltage of the light-emitting diode of the optical couple device U1 is $V_{conduction}$ (e.g., 0.7 V), the resistances of resistor R1 and resistor R2 are the same (e.g., 1000 ohms), Vba is smaller than the regulation voltage of the voltage-regulator tube D1 (e.g., 25 V), then the voltage-regulator tube D1 may not be conducted, the optical couple device U1 may also be not conducted, and the voltage on point g may be a relatively high-level voltage (e.g., Vcc). If Vba is larger than $C_{conduction}*R1+V_{conduction}+V_{regulation}$ (e.g., 26.7V), the optical couple device U1 may be conducted, point g may be grounded, and the voltage on point g (Vg) may be zero. In this case (the first control signal Vg is a relatively low-level voltage, e.g., zero), Vg may control the switching module 1022 (e.g., the switch units U2 and U3) to maintain the polarity of the data signal(s) as received, e.g., control the switch SW1 to connect with line e and control the switch SW2 to connect with line f.

It should be noted that the description about the detection module 510 and the switching module 520 are merely examples, and should not be limiting. In some embodiments, the connection between the voltage-regulator tube D1 and the optical couple device U1 may be changed. For example, the first anode of the optical couple device U1 may be in connection with line b, the first cathode of the voltage-regulator tube D1 may connect with the second cathode (or the second anode) of the optical couple device U1. In some embodiments, the detecting module 510 may include a comparator or an operational amplifier which may also realize the functions of the detection module 1021 shown in FIG. 10. As illustrated In FIG. 10, the switching module 1022 may include two switching units U2 and U3. The switching unit U2 may include a single-pole double-throw switch SW1. The switching unit U3 may include a single-pole double-throw switch SW2. In some embodiments, the switching module 520 may include one or more components that are configured to switch a pair of lines that transmit the received data signal(s) (e.g., lines e and f illustrated in FIG. 10). For example, the switching module 1022 may include one switching unit that may include a double-pole four-throw switch. The double-pole four-throw switch may also adapt the polarity of the data signal based on the one or more control signals received.

Figure 11:
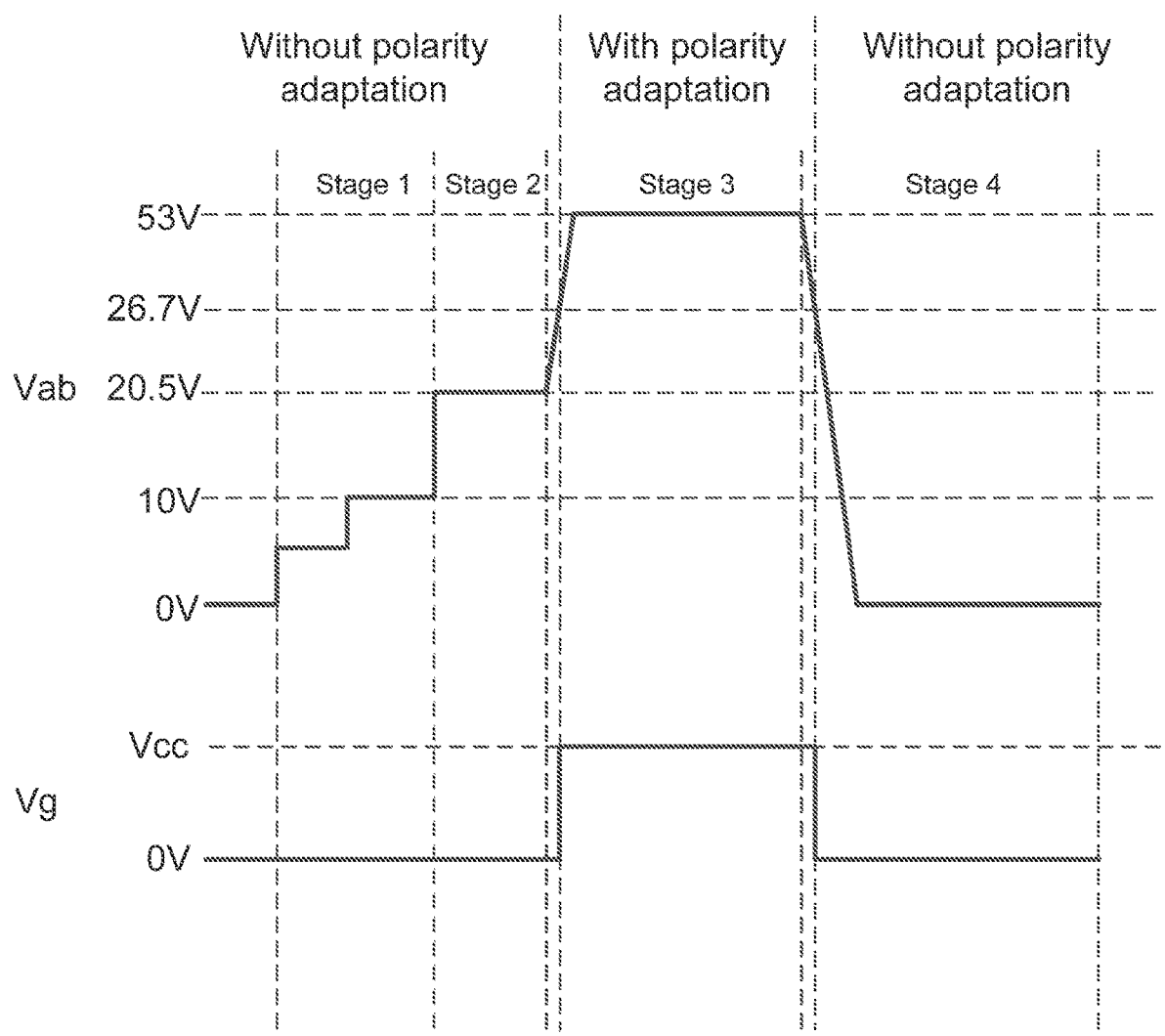
FIG. 11 is schematic diagram illustrating variation of signals in an exemplary PoE system according to some embodiments of the present disclosure.

FIG. 11 is schematic diagram illustrating variation of signals transmitted in an exemplary PoE system according to some embodiments of the present disclosure.

If a device connects with a PSE, power can be injected onto the cable connecting the PSE and the device at a suitable voltage, for example, between 44 V and 57 V. This relatively high voltage may allow efficient power transfer along the cable. However, the relatively high voltage may damage the device if the device does not support PoE. Therefore, before the PSE enable power to the device, the PSE may perform a detection process (stage 1 in FIG. 11). The detection process may be performed to determine whether the device is a PD. During the detection process, a lower voltage may be used. For example, a detection voltage may be applied. The detection voltage may be any suitable value. In some embodiments, the detection voltage may be 10 V.

In some embodiments, after the detection process, a classification process (stage 2 in FIG. 11) may be performed. The classification process may be performed to classify the PD, e.g., determine the power budget for the PD. During the classification process, a classification voltage larger than the detection voltage may be applied to the PD. The classification voltage may be any suitable value, for example, 15.5-20.5 V. In some embodiments, the classification voltage may be 20.5 V.

After one or more times of detection and classification processes, the PoE may enter a stage of power supplying (stage 3 in FIG. 11) to supply power to the PD. The power-supply voltage may be any suitable value. In some embodiments, the power-supply voltage may be 53 V. If the PD disconnects from the PSE, the PoE may stop supplying power to the PD (stage 4 in FIG. 11).

As described above, in some embodiments, if the PD and the PSE are not connected correctly (e.g., the PSE and the PD are connected via a crossover cable), during stage 1 and stage 2, the voltage on point g (Vg) may be a relatively low voltage (e.g., 0 V), and the polarity of the data signal(s) may be maintained; during stage 3, the voltage on point g (Vg) may be a relatively high voltage (e.g., a voltage Vcc), and the polarity of the data signal(s) may be reversed to be accordant with the polarity of the DC voltage. It should be noted that in some embodiments, as illustrated in FIG. 11, the adaptation of the polarity of the data signal(s) may be implemented only in the power supplying process, which may improve the stability of the PoE system 100*a* or 100*b*.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A polarity correction circuit, comprising:
a detection module, configured to detect a polarity of a DC voltage transmitted to a powered device and generate one or more control signals based on the polarity of the DC voltage, wherein the detection module includes:
a voltage-regulator tube including a first cathode and a first anode; and
an optical coupler device including a light emitting device and a light receiving device; and
a switching module, configured to:
receive the one or more control signals and a data signal transmitted from the powered device; and
adapt a polarity of the data signal based on the one or more control signals such that the polarity of the data signal is accordant with the polarity of the DC voltage.

2. The polarity correction circuit of claim 1, wherein the detection module is further configured to:
in response to the polarity of the DC voltage being accordant with a predetermined polarity, generate a first control signal, the first control signal being configured to control the switching module to maintain the polarity of the data signal as received.

3. The polarity correction circuit of claim 2, wherein the detection module is further configured to:
in response to the polarity of the DC voltage being inverted from the predetermined polarity, generate a second control signal, the second control signal being configured to control the switching module to reverse the polarity of the data signal.

4. The polarity correction circuit of claim 3, wherein the detection module is further configured to:
in response to the polarity of the DC voltage being inverted from the predetermined polarity and a voltage difference associated with the DC voltage being greater than a threshold, generate the second control signal.

5. The polarity correction circuit of claim 3, wherein the switching module is further configured to:
upon receiving the first control signal, maintain the polarity of the data signal as received; and
upon receiving the second control signal, reverse the polarity of the data signal.

6. The polarity correction circuit of claim 3, wherein
the first control signal is a relatively high-level voltage, and the second control signal is a relatively low-level voltage or a ground signal; or
the second control signal is a relatively high-level voltage, and the first control signal is a relatively low-level voltage or a ground signal.

7. The polarity correction circuit of claim 1, wherein the light emitting device includes a light-emitting diode, the light-emitting diode including a second cathode and a second anode, the first anode being in connection with the second anode.

8. The polarity correction circuit of claim 1,
wherein the light receiving device includes a phototransistor.

9. The polarity correction circuit of claim 1, wherein the detection module includes a comparator.

10. The polarity correction circuit of claim 1, wherein the switching module includes one or more switches configured to switch a pair of lines that transmit the received data signal.

11. The polarity correction circuit of claim 1, wherein the switching module includes a double-pole four-throw switch or two single-pole double-throw switches.

12. The polarity correction circuit of claim 1, wherein the polarity correction circuit is integrated in the powered device.

13. A polarity correction circuit, comprising:
a detection module, configured to detect a polarity of a DC voltage, the DC voltage being supplied by a first device and transmitted via a pair of a twisted pair cable to a second device, where the detection module includes:

a voltage-regulator tube including a first cathode and a first anode; and an optical coupler device including a light emitting device and a light receiving device; and a switching module, configured to:

receive a data signal transmitted from the second device;

adapt a polarity of the data signal based on the polarity of the DC voltage such that the polarity of the data signal is accordant with the polarity of the DC voltage.

14. The polarity correction circuit of claim 13, wherein the first device is a power sourcing equipment (PSE), and the second device is a powered device (PD).

15. The polarity correction circuit of claim 13, wherein the polarity correction circuit is integrated in the second device.

16. The polarity correction circuit of claim 13, wherein the pair of the twisted pair cable connects the first device and the second device.

17. The polarity correction circuit of claim 13, wherein the data signal is transmitted via the pair of the twisted pair cable to the first device after adaptation.

18. The polarity correction circuit of claim 13, wherein the first device and the second device are connected via a transformer.

19. A method for adapting a polarity of a data signal, implemented based on a polarity correction circuit, wherein the polarity correction circuit includes a detection module and a switching module, wherein the detection module includes:

a voltage-regulator tube including a first cathode and a first anode; and an optical coupler device including a light emitting device and a light receiving device;

the method comprising:

detecting, by the detection module, a polarity of a DC voltage transmitted to a powered device;

generating, by the detection module, one or more control signals based on the polarity of the DC voltage;

receiving, by the switching module, the one or more control signals and a data signal transmitted from the powered device; and adapting, by the switching module, a polarity of the data signal based on the one or more control signals such that the polarity of the data signal is accordant with the polarity of the DC voltage.

* * * * *